Nov. 7, 1972 S. S. NAGY ET AL 3,702,239

MAGNETIC STORAGE MEDIUM

Filed March 17, 1969

United States Patent Office 3,702,239
Patented Nov. 7, 1972

3,702,239
MAGNETIC STORAGE MEDIUM

Stanley S. Nagy, Studio City, and Floyd B. Humphrey, Pasadena, Calif., assignors to Sperry Rand Corporation
Filed Mar. 17, 1969, Ser. No. 807,899
Int. Cl. G11b *5/00;* C23b *5/50*
U.S. Cl. 29—195 18 Claims

ABSTRACT OF THE DISCLOSURE

A magnetizable storage member is formed from a substrate and thin layers deposited on the substrate. The first thin layer includes an element such as nickel having hard properties. A thin chemically inert layer such as gold may be disposed on the first thin layer. A third very thin layer of cobalt is disposed on the gold layer or directly on the first thin layer. The cobalt has a higher thickness when the storage member is to record and reproduce digital information. The cobalt has a decreased thickness when the storage member is to record and reproduce analog information having relatively high frequencies such as color information for a television receiver. A hard, thin, non-magnetic protective coating such as silicone may be disposed on the storage member and may be made from a silicone.

This invention relates to storage media for use with a magnetic transducer to obtain the recording of information on the media and the subsequent reproduction of such information from the media during the relative movement of the media past the transducer. The invention particularly relates to magnetic storage media having electroless or electroplated depositions with magnetic characteristics which provide faithful responses through an extended range of frequencies including those providing color information for television receivers.

Magnetic storage media such as discs are used to store information for use in computers. For example, the information may represent inventory in department stores or scientific measurements obtained from transducers. Magnetic transducers are disposed in contiguous relationship to the magnetic storage media to record information in magnetic form on the media or to reproduce the reccorded information from the media. It is also desired to use magnetic storage media to record analog information through an extended range of information such as information representing a color image for reproduction in a television receiver.

The magnetic storage media now in use have layers of iron oxide to store the magnetic information. The layers of magnetic information have certain response characteristics. Since the magnetic characteristics of the storage media are provided by the layers of iron oxide on the media and since the oxygen in the iron oxide has no magnetic properties, the frequency response of such media is relatively limited. This has prevented such media from being used to record and reproduce digital information at relatively high frequencies such as frequencies above approximately 2.5 meacycles. It has also prevented such media from being used to record and reproduce analog information at relatively high frequencies such as information representing a color image for subsequent reproduction in a television receiver.

In addition to magnetic storage media with coatings of iron oxide, magnetic storage media are also provided with layers of elements electrolessly or electrically deposited on a substrate with magnetic properties. For example, layers of nickel and cobalt have been electrolessly or electrically deposited on a substrate to form magnetic storage media. The media formed with substrates of nickel and cobalt have certain advantages in comparison to those formed with coatings of iron oxide. One advantage is that substantially all of the material in the electroless or electrical depositions has magnetic properties whereas the oxygen in the coatings of iron oxide has no magnetic properties. Another advantage is that the iron oxide is considerably more abrasive than electroless or electrical depositions of nickel or cobalt so that magnetic transducers tend to become worn or damaged relatively quickly when contacted by the iron oxide. A further advantage is that magnetic storage media using electroless or electrical depositions are able to operate satisfactorily through a greater frequency range than those using iron oxide.

Various attempts have been made to provide electroless or electrical depositions of nickel or cobalt on a media such as discs with frequency response characteristics as high as fifteen (15) megacycles so that color information can be recorded on the media for subsequent reproduction in a television receiver. Such results have not been very successful.

This invention provides magnetic storage media with magnetic depositions having characteristics to record information relating to a color image on the media. Furthermore, the media are able to record and reproduce digital information in an extended range such as a range of several megacycles. The storage media have further advantages in that neither the media nor the magnetic head operating in conjunction with the media are damaged when the head inadvertently contacts the media.

The media constituting this invention include a first layer electrolessly or electrically deposited from a suitable element such as nickel. The first layer has hard properties and may have a thickness in the order of several hundred microinches. A chemically inert layer formed from a suitable element such as gold may be deposited on the first magnetic layer and is provided with a thickness up to approximately one hundred (100) microinches. A very thin layer of cobalt is electrolessly or electrically deposited on the chemically inert layer and is provided with magnetic properties. A thin protective coating of a hard, non-magnetic material such as a silicone may be disposed on the very thin layer of cobalt to prevent the layer of cobalt and the head from being damaged upon contact between the storage media and the magnetic head.

As a first step in forming the magnetic storage media, the element constituting the first hard layer is deposited on a suitable substrate such as aluminum. The chemically inert layer may then be deposited on the first magnetizable layer and the element constituting the layer of cobalt is subsequently deposited in a very thin layer on the chemically inert layer. The protective coating is applied on the layer of cobalt as a next step when the protective coating is included. The magnetic storage media are then baked at a suitable temperature such as approximately 750° F. for a particular period of time dependent upon whether the media are to be used to record and reproduce digital or analog information. The cooling of the media after the baking operation is also dependent somewhat upon whether the media are to record and reproduce digital or analog information.

Figure 1:
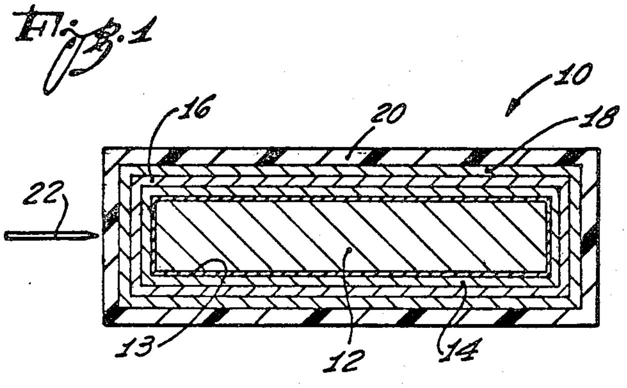
FIG. 1 is a sectional view of a magnetic storage medium, such as a disc, constituting one embodiment of the invention.

In the embodiment of the invention shown in FIG. 1, a magnetic storage medium included within the concepts of this invention constitutes a disc generally indicated at 10 although other media than discs may also be used. The magnetic storage medium 10 includes a substrate 12 made from a suitable material such as aluminum. Aluminum is advantageous because it is relatively light and can be easily accelerated or decelerated to any desired speed. Aluminum is also advantageous because it can be formed more easily than many other materials to provide a substantially uniform surface on which thin layers of magnetic material can be deposited. Furthermore, since aluminum is relatively strong, it does not become deformed even if it should be subjected to relatively great impact forces by contact with a magnetic transducing head as it is moved past the head.

A very thin layer 13 of magnetizable nickel having a thickness in the order of five (5) microinches is deposited on the substrate 12. A thin layer 14 of a suitable material such as nickel is electrolessly or electrically deposited on the nickel layer 13. The layer 14 preferably has a thickness of several hundred, such as three hundred (300), microinches. Preferably, the thin layer 14 is initially in a non-magnetizable state and is retained in non-magnetizable form. However, if nickel is used, the nickel may be converted to a magnetizable state after it has been baked at a particular temperature such as approximately 750° F. for a period of time dependent upon the use to which the medium is to be put.

Certain of the ingredients included in the bath to produce the layer 14 are preferably obtained from the Stapleton Company of Glendale, Calif., and are designated by that company under the trademark "Sta Buff." These ingredients include a salt, such as the sulfate, of a material such as nickel initially having magnetic properties and hopefully having non-magnetic properties even after the application of heat. To provide the layer 14 initially with non-magnetic characteristics and hopefully with non-magnetizable properties in the finished medium even after the application of heat, the nickel is included in the layer 14 in a range of approximately 87% to 93% by weight with phosphorus constituting essentially the remainder by weight. Preferably, nickel and phosphorus are included in the layer 14 in respective weights of approximately 90% and 10%.

A thin layer 16 of a chemically inert material such as gold may be disposed on the thin layer 14 of magnetic material. The thin layer 16 may be provided with a suitable thickness such as a thickness in the order of (10) to one hundred (100) microinches. In addition to gold, other chemically inert materials such as silver, platinum and palladium may also be used as may any other noble metal. Copper is another material which may also be used for the layer 16. Gold is advantageous, however, for certain important reasons. It is easily applied and is relatively inexpensive in comparison to the other noble metals. Furthermore, it can be applied in a single bath whereas certain of the other noble metals such as silver generally have to be applied in two (2) baths, one to apply a flash layer and the other to provide the desired thickness.

A second very thin layer 18 of a magnetizable material such as cobalt is disposed on the chemically inert layer 16. The layer 18 may have a thickness in a range up to approximately fifteen (15) or twenty (20) microinches, for example. When the magnetic storage medium constituting this invention is to be used to record digital information in a range of frequencies of several megacycles, the layer 18 may have a thickness of approximately twelve (12) microinches. However, the layer 18 may have a thickness of approximately three (3) microinches when the medium is to be used to record and reproduce analog information such as that representing color images.

The magnetic storage medium 10 may be produced in a manner similar to that described below. When the substrate 12 constitutes aluminum, it is cleaned of dirt and other impurities and prepared in a conventional manner so that a fresh surface of aluminum is presented. A chemical solution of sodium zincate is then applied in a conventional manner to the freshly prepared surface of the aluminum substrate to exchange aluminum ions with zinc ions on this surface. The chemical solution of sodium zincate may be obtained from the Enthone Corporation of New Jersey under the trademark "Alumon D." The zincated surface of the substrate 10 is then rinsed with tap water and dried.

The flash coating or layer of a suitable material such as magnetic nickel is then applied as by electroless deposition to the zincated surface of the substrate to form the layer 13. The electroless deposition may be applied in a conventional manner at somewhat elevated temperatures by an electroless bath having a pH of at least eight (8) to make the nickel magnetic. When nickel is magnetic, it tends to have a composition of at least 93% by weight, with the remainder being phosphorus. Magnetic nickel is advantageous because it adheres well to the zincated surface and because it tends to remove loose zincate from the surface. This results in part because magnetic nickel does not have as great an affinity to the zincate as non-magnetic nickel, which tends to adhere the loose zincate to the aluminum substrate.

In one particular electroless bath, the following materials may be used:

| Material: | Percentage by wt. |
|---|---|
| Sodium citrate | 10 |
| Sodium potassium tartrate | 5 |
| Versene (complexing agent salt) | 1.6 |
| Sodium hypophosphite | 1.6 |
| Nickel sulphate | (1) |
| Ammonium hydroxide | (2) |

[1] Sufficient to create at least 93% nickel in the electroless deposition.
[2] Sufficient to create a pH of approximately 9.

In the electroless bath specified in the previous paragraph "Versene" is the tetrasodium salt of ethylenediamine-tetraacetic acid. The hypophosphite salt in the electroless bath specified in the previous paragraph constitutes a reducing agent to reduce the metallic salts to a metal for the deposition on the prepared surface of the backing element 12. The citrate and tartrate salts as complexing agents to maintain in solution the salts of the magnetic materials in the plating bath for reduction by the hypophosphite ions. The citrate and tartrate salts also serve as buffers. Versene also serves as a complexing agent, and the ammonia acts to maintain the pH of the solution within particular limits such as between 8 and 10. The electroless bath is applied at a suitable temperature such as a temperature between approximately 70° F. and 80° F. This bath is instrumental in depositing the magnetic nickel at a particular rate such as approximately one (1) microinch per minute. Although the flash coating has been described as being produced by electroless techniques, it will be appreciated that the flash coating may be produced by electroplating the nickel on the aluminum surface.

After the application of the flash coating of magnetic nickel, the surface of the substrate is again preferably rinsed. The layer 14 of non-magnetic nickel is then applied to the surface of the magnetic nickel as by an electroless bath. This bath may be formed in a manner similar to that described above except that a pH of six (6) or below is provided and the nickel ions are disposed in the bath to provide a concentration of nickel in the layer 14 in a range of approximately eighty-seven percent (87%) to ninety-three percent (93%) by weight. Preferably the bath has a pH of approximately 4. The bath is provided with a temperature of approximately 80° C. to 85° C. and is applied for a period of approximately four (4) hours to produce a thickness of approximately five hundred (500) microinches for the nickel layer 14. The nickel deposited in the layer 14 is at least initially non-magnetic. Although the layer 14 of non-magnetic nickel has been described as being produced by electroless techniques, it will be appreciated that the layer 14 may also be produced by electroplating.

The surface of the layer 14 is then rinsed and dried. A portion of the nickel layer 14 such as a thickness of approximately two hundred (200) microinches is subsequently removed as by shaving to leave a thickness of approximately three hundred (300) microinches for the layer. By shaving the layer 14, the remaining surface of the layer 14 is made extremely smooth. This is important in insuring that the surfaces of the layers 16 and 18 subsequently deposited on the layer 14 are also smooth. By providing the layer 16 and 18 with uniform thicknesses, the operation of the member 20 is enhanced, particularly at the upper end of the frequency range when this range extends through a number of megacycles.

The chemically inert layer 16 such as gold is then applied in a conventional manner as by an electrolytic plating process. The gold is applied for a suitable period of time such as approximately two (2) minutes at a suitable temperature in the order of 30° C. to 35° C. to produce a thickness of approximately fifteen (15) to twenty (20) microinches for a medium which is to be used to record and reproduce analog information such as color information for a television receiver. The gold is plated for an extended period of time to produce a thickness in the order of seventy five (75) to one hundred (100) microinches when the medium is to be used to record and reproduce digital information in the range of several megacycles. The surface of the substrate is again preferably rinsed and dried, and the layer 18 of cobalt is applied to the substrate as by an electroless bath in a manner similar to the layer 14. The bath used in applying the layer of cobalt may be similar to that specified above for applying the flash layer of nickel except that cobalt sulfate may be substituted for nickel sulfate in the bath. The layer 18 of cobalt may be applied in a thickness greater than that desired since a portion of the cobalt becomes removed during the step of baking the member 10, as described in detail subsequently. For example, cobalt is applied in a layer of approximately fifteen (15) to twenty (20) microinches when a layer of approximately twelve (12) microinches is desired in a medium which is to be used to record and reproduce digital information. Similarly, the layer 18 is applied with a thickness of approximately six (6) to eight (8) microinches when a thickness of approximately three (3) to four (4) microinches is desired for a medium which is to be used to record and reproduce analog information such as a color image for a television receiver.

A thin coating 20 of silicone varnish may be subsequently applied to the substrate under dust-free conditions and the substrate such as the disc is spun at relatively high speeds to make the thickness of the varnish substantially uniform and to remove excess varnish and to allow the coating to harden. The thickness of the coating is very thin such as in the order of approximately five (5) microinches. As will be appreciated, the coating of silicon varnish does not have to be applied to the substrate to produce the magnetic storage medium constituting this invention. This is especially true if the head 22 will not contact the medium.

The medium such as the disc is then baked at a particular temperature such as approximately 750° F. for a particular period of time dependent upon the use to which the disc is to be put. For example, the medium is baked for a suitable period of time such as approximately thirty (30) minutes at a temperature of approximately 750° F. with the oven pre-heated to such temperature when the medium is to be used to record and reproduce digital information in a range of frequencies of several megacycles. However, the oven is pre-heated to a temperature of approximately 400° F. and the oven is then set to approximately 750° F. and the medium is inserted into the oven and baked at this temperature of 750° F. for a period of approximately two (2) hours with the fan in the oven on when the medium is to be used to record and reproduce analog information such as color images for television receivers. This temperature of approximately 750° F. is greater than that at which magnetic media are normally baked. The baking occurs in air although it may also occur in a neutral medium such as nitrogen.

The medium is then cooled in a manner dependent upon the use to which the medium is to be put. For example, when the medium is to be used to record and reproduce analog information, the medium may be cooled in the oven for about an hour with the fan on so that the temperature becomes approximately 500° F. at the end of the hour. The medium is then disposed in air at ambient temperatures and cooled or it may be maintained in the oven with the fan on. When the medium is to be used to record and reproduce digital information, the medium is preferably removed from the oven after the baking operation and is cooled in air. This is to minimize the amount of cobalt which is burned from the layer 18 after the baking operation has been completed. The silicone may be Silicone 1377 varnish manufactured by Dow Corning. This constitutes a silicone which is dissolved in methyl Cellosolve and which is provided with a silicium carbon bond. The silicone coating preferably has a thickness in the order of a few microinches such as approximately five (5) microinches.

The silicone coating has certain important advantages. It is insoluble in commonly used solvents including water and is chemically inert after being cured and provides protection against the environment. It also causes the external surface of the magnetic storage medium to be hard and slippery, particularly after the baking operation, so that a magnetic head 22 disposed in contiguous relationship to the medium 10 tends to bounce from the medium upon any contact with the medium. This minimizes any tendency for the magnetic head 22 to damage the medium or affect the magnetic characteristics of the medium upon a contact between the head and the medium as the medium moves past the head. For example, in previous coatings corresponding to the coating 20, the coating has been removed upon contact with the head so as to expose the layer of magnetic material corresponding to the layer 18 and cause the magnetic material to be removed upon further contact with the head. The silicone coating also prevents the head 22 from being damaged as by an abrasive action if the medium contacts the head as the medium moves past the head. Contact between the medium 10 and the head 22 becomes an increasingly likelihood as the packing density of the information on the head or the frequency of information response increases since the spacing between the medium and the head decreases with increased packing densities.

Actually, applicants are not certain if any of the silicone in the layer 20 remains on the medium after the baking operation. For example, applicant has noted that the outer surface of the medium tends to be electrically conductive after the baking operation, particularly when the medium has been baked for a period of approximately two (2) hours to produce a medium such as a video disc. This may indicate that the silicone in the layer 20 has become carbonized. Since the coating has become conductive, electrical charges tend to accumulate on the disc. These charges are grounded during the operation of the disc in recording and reproducing information.

Figure 2:
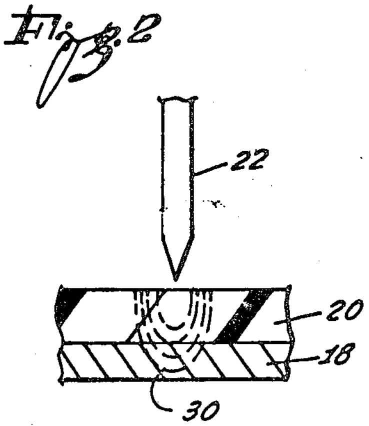
FIG. 2 is an enlarged sectional view of a portion of the medium shown in FIG. 1 and a magnetic head disposed in contiguous relationship to the medium and further illustrates schematically the pattern in which magnetic flux is produced in the medium by the magnetic head.

The media described above have certain important advantages. When the media are used to record and reproduce analog information such as color images, the media are able to provide a reliable and faithful transducing action on the information through a range of frequencies in the multi-megacycle range such as a range up to approximately fifteen (15) megacycles and higher. In recording and reproducing such analog information, a magnetic head such as illustrated at 22 in FIG. 1 is used. This magnetic head causes magnetic flux to be produced as illustrated at 30 in FIG. 2. As will be appreciated, this flux is localized essentially in the layer 18 even though the layer 18 is relatively thin. Because of this flux localization and because the cobalt in the layer 18 produces a relatively large amount of flux per unit of area, the magnetic response of the medium 10 to digital or analog information is relatively great. For example, densities as high as approximately ten thousand (10,000) bits per inch have been satisfactorily recorded and reproduced when the media have been used to record and reproduce digital information.

Figure 3:
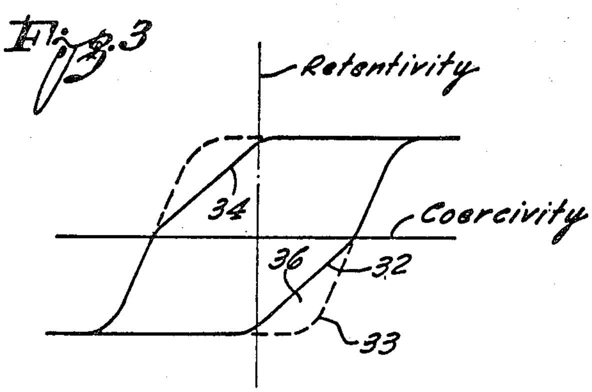
FIG. 3 illustrates a hysteresis response curve of the magnetic storage medium shown in FIG. 1 after the medium has been baked at elevated temperatures as one of the steps in the methods included in this invention.

The hysteresis responsive curve of the media constituting this invention is illustrated by the curve 32 in FIG. 3. In FIG. 3, the coercivity of the media is illustrated along the horizontal axis and the retentivity of the media is illustrated along the vertical axis. As will be seen, the curve 32 has a shape approximating the hysteresis curve 33 normally obtained for cobalt except for sloped portions 34 and 36. These sloped portions 34 and 36 result from the effect of the nickel layer 14, which tends to become magnetic when the media are baked at the elevated temperatures such as approximately 750° F.

Each of the layers in the media constituting this invention contribute certain advantages to the optimum results obtained for the media. For example, the layer 14 is advantageous, particularly when nickel is used, in that it can be adhered to the aluminum substrate 12 and can be polished to an extremely smooth surface. This is important in insuring that the layers 16 and 18 will have a smooth surface and a uniform thickness. The shaving of the layer 14 to make it smooth is important since the layer 16 cannot be smoothed after being deposited because it is too soft. Furthermore, the layer 18 of cobalt cannot be smoothed after being deposited since it is too thin.

Preferably the layer 14 is non-magnetic but the characteristics of the media will not be seriously impaired even if the nickel in the layer becomes magnetic. The nickel is farther advantageous because the gold in the layer 16 can be adhered to the nickel.

The use of nickel for the layer 14 is partially desired since nickel is hard and the hardness of the nickel is even further increased as a result of the baking operation. It is desirable to cover the aluminum substrate 12 with a hard layer to protect the aluminum, which is somewhat soft, and to prevent the media from becoming pitted or dented as a result of any contacts between the head 22 and the media. If the media should become pitted or dented, the transfer of information between the media and the head 22 would become impaired as a result of changes in spacing between the media and the head at the position of the pitting or denting.

If the cobalt in the layer 18 were deposited directly on the layer 14, it would tend to become absorbed in the nickel, particularly when it is deposited in the very thin dimensions described above for the layer. This would prevent the media from having the optimum characteristics described above, particularly at the high frequencies in the range of several megacycles. This is especially true since the cobalt tends to disappear in blotches into the nickel.

When the layer 16 such as gold is disposed between the layers 14 and 18, it serves as a barrier to prevent the cobalt in the layer 18 from infiltrating into the layer 14. It also tends to shield the layer 14 magnetically from the layer 18, so that any magnetic effects of the layer 14 on the layer 18 are minimized. It also provides a good bond with the layers 14 and 18 to insure that the materials in the different layers remain adhered to the media.

The deposition of the cobalt on the gold layer 16 in a particular thickness and the subsequent baking of this layer offer certain advantages. One advantage is that the thickness of the layer becomes reduced to a value where the cobalt could not be initially deposited, at least on the basis of a uniform thickness. This is especially true when a thickness of three (3) or four (4) microinches of cobalt is produced for the layer 18 after the baking operation for media which are to be used to record and reproduce analog information such as color images for television receivers.

Figure 4:
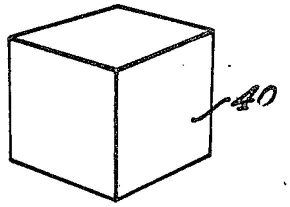
FIG. 4 illustrates the appearance of a cobalt crystal in one of the layers of the medium before the medium has been baked at elevated temperatures as one of the steps in the method included in this invention.
Figure 5:
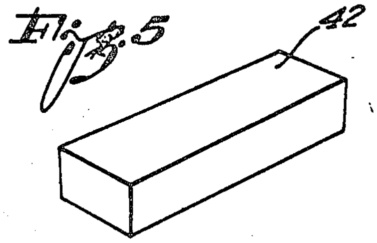
FIG. 5 illustrates the appearance of a cobalt crystal in one of the layers of the medium after the medium has been baked at elevated temperatures as one of the steps in the method included in this invention.

The reduction in the thickness of the layer 18 of cobalt may result from a change in the crystalline structure of the cobalt. For example, the crystalline structure of the cobalt before the heat treatment may be as shown in FIG. 4 at 40 and the crystalline structure of the cobalt after the heat treatment may be as shown in FIG. 5 at 42. The cobalt has magnetic properties before and after the baking operation but the magnetic output of the cobalt tends to decrease slightly as a result of the baking operation.

Since the thickness of the cobalt in the layer 18 decreases as a result of the baking operation, the range of frequency response of the media increases. This is especially important when the media constitute discs which are to be used to record and reproduce color images for television receivers. The reason is that these images have frequencies as high as fifteen (15) megacycles. However, as the thickness of the cobalt layer 18 is decreased, any undesirable effects resulting from imperfections in the thickness or composition of the layer tend to become magnified.

Figure 6:
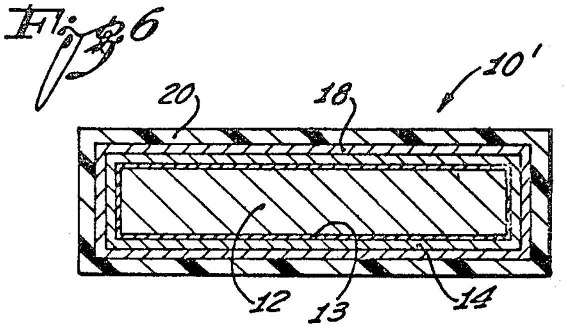
FIG. 6 is an enlarged sectional view of a second embodiment of the invention.

Actually, the cobalt in the layer 18 can be recorded directly on the layer 14 when only the analog information representing black-and-white images is to be recorded on the media and reproduced from the media, as shown in FIG. 6. As a result, the gold layer 16 can be eliminated. This results from the fact that the analog information representing black-and-white images has a frequency range of only approximately five (5) megacycles. A disc generally indicated at 10' in FIG. 6 is accordingly produced.

Figure 7:
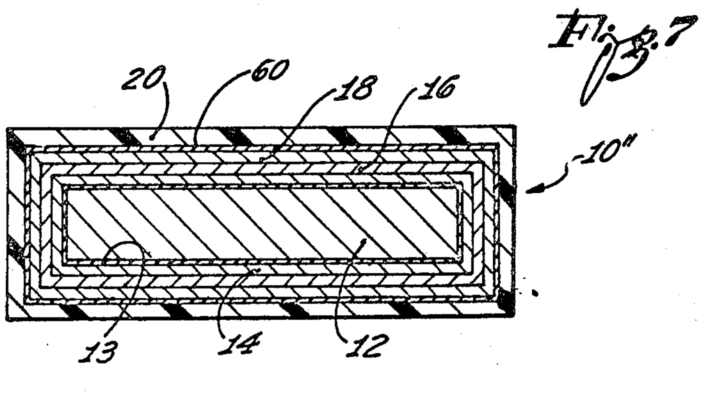
FIG. 7 is an enlarged sectional view of a third embodiment of the invention.

FIG. 7 illustrates another embodiment of the invention. In this embodiment, a layer 60 of a suitable material such as nickel is disposed on the layer 18 of cobalt before the coating 20 of silicone is applied. The layer 60 may be provided with magnetic properties and may be provided with relatively thin dimensions such as approximately two (2) or three (3) microinches. A disc generally indicated at 10'' in FIG. 7 is accordingly produced.

The layer 60 offers certain important advantages. It tends to increase the adherence between the layer 18 of cobalt and the coating 20 of silicone. It also tends to increase the response of the medium at certain frequencies by a considerable amount as high as fifty percent (50%) to seventy five percent (75%). This is particularly true at intermediate frequencies in the frequency range such as frequencies between approximately five (5) megacycles and ten (10) megacycles. The increased response of the medium at such intermediate frequencies may result from the operation of the layer 60 in inhibiting the removal of cobalt in the layer 18 during the baking operation.

The layer 60 is further advantageous in that it constitutes hard material which further shields the cobalt in the layer 18 from damage upon any crashes between the head 22 and the medium 10.

Instead of constituting nickel, the layer 60 may constitute a suitable material such as non-magnetic cobalt. This layer is advantageous because it is relatively hard so that it further protects the medium such as the disc against damage resulting from crashes with the head 22. Since the layer 60 of cobalt is non-magnetic, it does not provide any improvement in the magnetic characteristics of the medium. The non-magnetic cobalt may be applied as by an electroless bath having a conventional composition except that the bath is provided with a suitable pH such as a pH between approximately 7.5 and 8.

Although the layer 18 has been described as constituting cobalt, it will be appreciated that other magnetic materials may be used without departing from the scope of the invention. However, the range of frequencies provided by the medium may not be as great as when cobalt is used. Furthermore, alloys of cobalt with other materials such as nickel and iron may be used. However, when such alloys are used, the response of the medium tends to decrease from that which is obtained when only cobalt is used for the layer 18.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination in a member for use with a magnetic head to record and reproduce magnetic information, which combination consists essentially of:
- a non-magnetic substrate;
- a first thin layer of a hard element on the substrate;
- a thin layer of an inert element selected from the noble elements and copper, the inert element being disposed on the first thin layer of the hard element to inhibit any effect of the member of the first thin layer in the recording and reproduction of information; and
- a very thin layer of cobalt on the thin layer of the inert element.

2. The combination set forth in claim 1 wherein a thin hard coating is disposed on the very thin layer of cobalt.

3. The combination set forth in claim 1 wherein a very thin layer of a magnetizable material is disposed on the very thin layer of cobalt.

4. The combination set forth in claim 1 wherein
- the substrate is aluminum;
- the first thin layer includes nickel; and
- the thin inert layer is gold.

5. In combination in a member for use with a magnetic head to record and reproduce magnetic information,
- a non-magnetic substrate of aluminum;
- a first thin layer of nickel material on the substrate;
- a thin layer of gold, said gold being disposed on the nickel to inhibit any effect of the member of the first thin layer in the recording and reproduction of information;
- a very thin layer of cobalt on the thin layer of gold;
- a very thin layer of nickel on the very thin layer of cobalt; and
- a very thin hard coating of a silicone disposed on the very thin layer of nickel.

6. In combination in a member for use with a magnetic head to record and reproduce magnetic information, which combination consists essentially of:
- a non-magnetic substrate;
- a first thin layer of a hard material disposed on the non-magnetic substrate;
- a second thin layer disposed on the first thin layer, the second thin layer being formed from a chemically inert element having properties of inhibiting the passage of atoms or molecules of material through the second thin layer and of inhibiting any effect of the first thin layer on the magnetic properties of the member during the recording and reproduction of information; and
- a third very thin layer of a magnetizable material disposed on the second thin layer.

7. The combination set forth in claim 6 wherein the first thin layer includes nickel and the second layer constitutes gold and the substrate is aluminum and the third very thin layer is cobalt.

8. The combination set forth in claim 7 wherein the first thin layer has a thickness in the order of several hundred microinches and the second thin layer has a thickness up to about one hundred microinches.

9. The combination set forth in claim 6 wherein a very thin, hard, protective, non-magnetic coating is disposed on the third thin layer of magnetizable material.

10. The combination set forth in claim 6 wherein a fourth very thin hard layer of a magnetizable material is disposed on the third very thin layer of magnetizable material and wherein the magnetizable material in the fourth very thin layer is different from the magnetizable material in the third very thin layer.

11. In combination in a member for use with a magnetic head to record and reproduce magnetic information,
- a non-magnetic substrate of aluminum;
- a first thin layer of a nickel material disposed on the non-magnetic substrate;
- a second thin layer disposed on the first thin layer, the second thin layer being formed from gold;
- a third very thin layer of cobalt disposed on the second thin layer; and
- a very thin, hard, protective silicone coating disposed on the third very thin layer.

12. In combination in a member for use with a magnetic head to record and reproduce magnetic information, which combination consists essentially of:
- a non-magnetic substrate;
- a first thin layer of a hard material disposed on the non-magnetic substrate;
- a second very thin layer of cobalt disposed on the first thin layer; and
- a third very thin layer of a hard magnetizable material disposed on the second thin layer.

13. The combination set forth in claim 12 wherein a very thin coating of a hard non-magnetic material is disposed on the third very thin layer.

14. The combination set forth in claim 12 wherein the first thin layer and the third very thin layer include nickel.

15. The combination set forth in claim 14 wherein the first thin layer has a thickness in the order of several hundred microinches, the second very thin layer has a thickness up to approximately twenty (20) microinches and the third very thin layer has a thickness in the order of three (3) microinches.

16. A combination in a member for use with a magnetic head to record and reproduce magnetic information,
- a non-magnetic substrate;
- a first thin layer of a nickel material disposed on the non-magnetic substrate;
- a second very thin layer of cobalt disposed on the first thin layer;
- a third very thin layer of a nickel material disposed on the second thin layer; and
- a very thin coating of a hard silicone is disposed on the third very thin layer.

17. In combination in a member for use with a magnetic head to record and reproduce magnetic information, which combination consists essentially of:
- a non-magnetic substrate;
- a first thin layer of a hard material disposed on the non-magnetic substrate;

a second very thin layer of cobalt disposed on the first thin layer; and a very thin coating of a hard silicone disposed on the second very thin layer of cobalt.

18. In combination in a member for use with a magnetic head to record and reproduce magnetic information, a non-magnetic substrate of aluminum;

a first thin layer of a nickel material disposed on the non-magnetic substrate;

a second very thin layer of cobalt disposed on the first thin layer; and a very thin coating of a hard silicone material disposed on the second very thin layer of cobalt.

References Cited

UNITED STATES PATENTS

| | | | |
|---|---|---|---|
| 3,348,931 | 10/1967 | Reekstin | 29—183.5 |
| 3,411,892 | 10/1968 | Sasaki et al. | 29—183.5 |
| 3,466,156 | 9/1969 | Peters et al. | 29—195 |
| 3,471,272 | 10/1969 | Wilhelm et al. | 29—194 |
| 3,479,156 | 11/1969 | Ginder | 29—183.5 |

L. DEWAYNE RUTLEDGE, Primary Examiner

E. L. WEISE, Assistant Examiner

U.S. Cl. X.R.

29—197, 199; 340—174 TF